ately examiner—Lawrence Cruz

United States Patent [19]

Berdichevsky

[11] Patent Number: 4,875,397
[45] Date of Patent: Oct. 24, 1989

[54] PRESET QUICK CHANGE TOOLING FOR A RECESS CUTTING ATTACHMENT

[75] Inventor: Boris Berdichevsky, Wilmette, Ill.
[73] Assignee: Sloan Valve Co., Franklin Park, Ill.
[21] Appl. No.: 312,362
[22] Filed: Feb. 15, 1989

Related U.S. Application Data

[63] Continuation of Ser. No. 124,176, Nov. 23, 1987, abandoned.
[51] Int. Cl.⁴ .............................................. B23B 29/00
[52] U.S. Cl. .......................................... 82/60; 82/158; 82/161
[58] Field of Search .................... 82/158, 160 O, 161, 82/164, 129, 139, 137

[56] References Cited

U.S. PATENT DOCUMENTS 2,908,963  8/1959  Gollus ............................... 82/36 R
4,590,827  5/1986  Wiltsie ................................. 82/11

Primary Examiner—Frederick R. Schmidt
Assistant Examiner—Lawrence Cruz
Attorney, Agent, or Firm—Kinzer, Plyer, Dorn, McEachran & Jambor

[57] ABSTRACT

A recess attachment with preset quick change tooling for use on a multiple spindle automatic machine includes a base formed and adapted to be mounted at a work station on an automatic machine. The base is movable in a defined direction during a machining operation and has a slide mounting surface in a plane forming a small acute angle with the direction of movement. A slide is positioned on the slide mounting surface and there are springs attached to the base and the slide inhibiting relative movement therebetween. A tool holder is removably mounted on the slide and there is an adjustment member positioned on the tool holder and a cooperating stop on the slide. The tool holder has a tool receiving opening and there are means for fastening a cutting tool in the opening. The base and slide move in unison to a precutting position. Further movement of the base relative to the slide causes the slide and the cutting tool mounted thereon to move in a direction generally perpendicular to base movement to cut a recess in a workpiece.

3 Claims, 2 Drawing Sheets

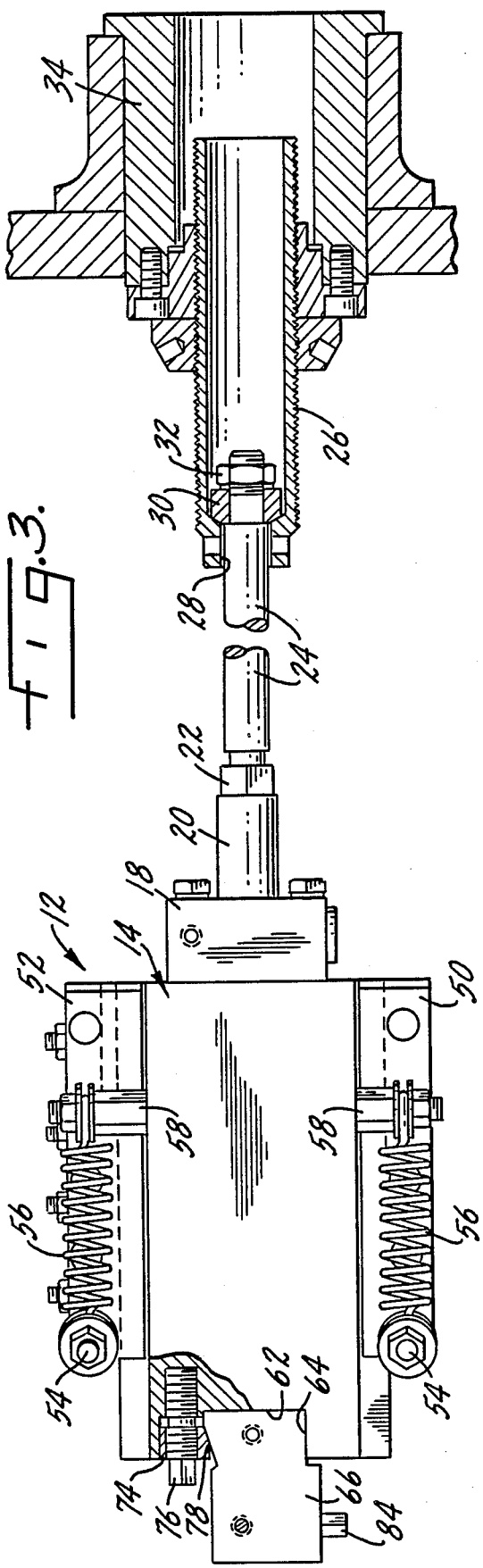
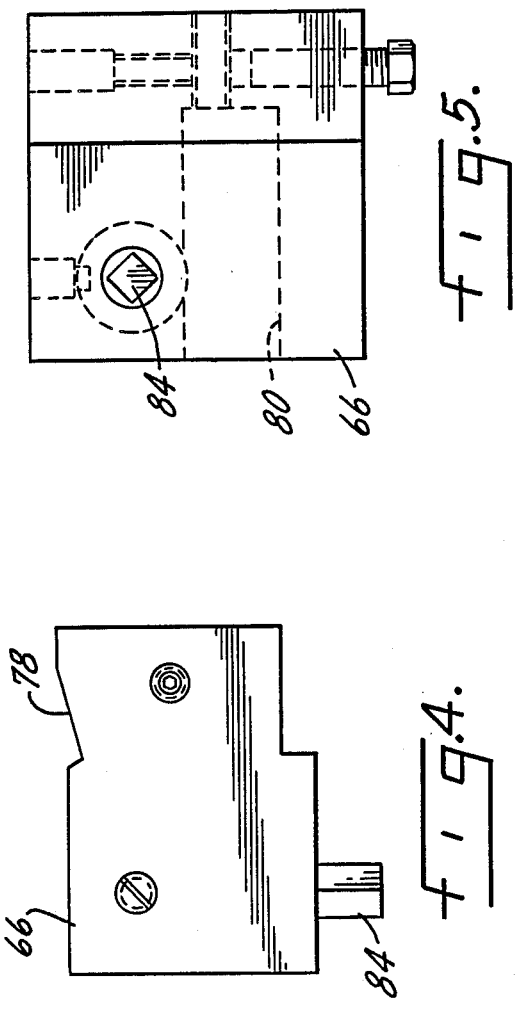

PRESET QUICK CHANGE TOOLING FOR A RECESS CUTTING ATTACHMENT

This is a continuation of co-pending application Ser. No. 124,176 filed on Nov. 23, 1987 now abandoned.

SUMMARY OF THE INVENTION

The present invention relates to a recess attachment with preset quick change tooling for use on a multiple spindle automatic machine.

A primary purpose of the invention is a recess attachment for use on an automatic multiple spindle machine in which there is a replaceable and interchangeable tool holder which mounts a cutting tool with both the cutting tool position and an adjustment screw on the tool holder being preset prior to insertion in the recess attachment.

Another purpose is a quick change preset tool holder for use on a multiple spindle automatic machine which facilitates initial adjustment and minimizes set-up scrap.

Another purpose is a quick change preset tool holder as described in which the tool block is positioned within a slide nest having a pair of mutually perpendicular surfaces, with the tool block being removably positioned and snugly held against the mutually perpendicular surfaces.

Another purpose is a recess attachment as described which minimizes machine set-up time and facilitates tool changing with consequent substantially increased machine productivity.

Other purposes will appear in the ensuing specification, drawings and claims.

BRIEF DESCRIPTION OF THE DRAWINGS

The invention is illustrated diagrammatically in the following drawings wherein:

FIG. 3 is a top plan view of the recess attachment and a portion of its associated machine drive, in section, FIG. 4 is a top view of a tool holder on an enlarged scale, and FIG. 5 is a side view of the tool holder.

DESCRIPTION OF THE PREFERRED EMBODIMENT

Figure 1:
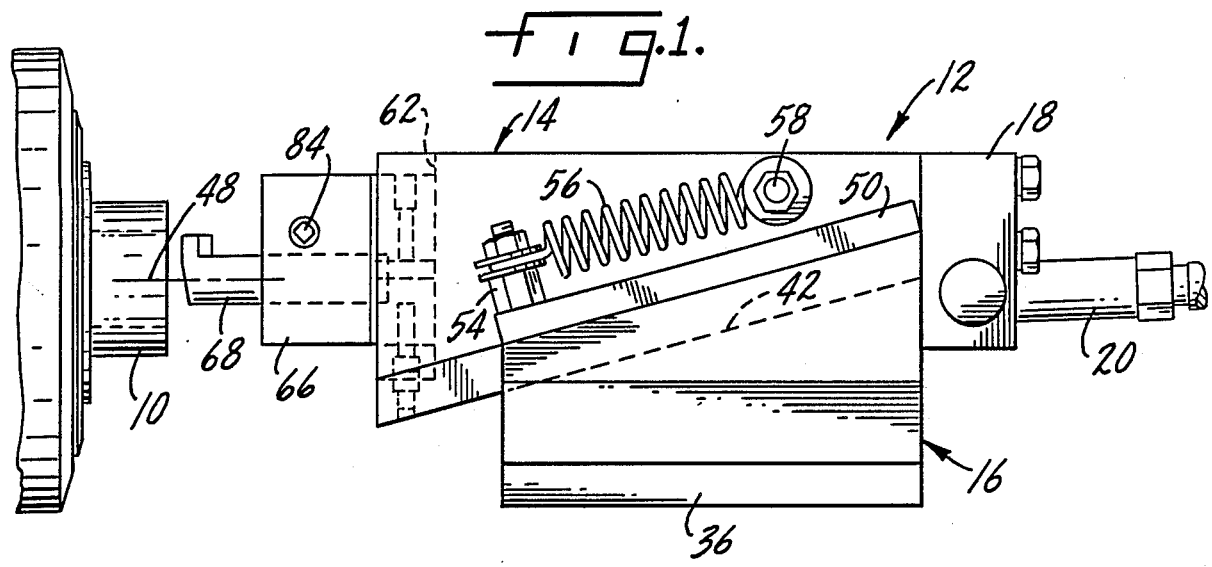
FIG. 1 is a side view of a recess attachment of the type described.

This invention relates to a method of quick changing and presetting a tool in a recess attachment to be used on automatic multiple spindle and other automatic screw machines. It is particularly advantageous in enhancing machine up time and minimizing scrap. Various recess attachments are currently available on the market. Some machine tool manufacturers such as Acme, Gridley, New Britain, Conomatic and others offer recess attachment in which the tool is rigidly clamped either in a slide or in a tool holder which in turn is fixed to the slide of the recess attachment. There are numerous disadvantages to such devices, specifically that there are no means provided to set the tool's cutting edge on center; tool adjustment in a vertical direction requires that the whole body of the attachment be moved with respect to a machine's turret, which is a time consuming operation; and tool adjustment in a horizontal direction requires a consequent tool adjustment in a vertical direction since the attachment slide is mounted at an angle with respect to a horizontal axis of the spindle.

The present invention provides a quick change preset tool holder which is incorporated into a recess attachment's slide. By using a preset tool holder, down time of the machine is substantially reduced as initial adjustment is done in a minimum time and there is a minimum of scrap utilized in confirming that the tool is properly positioned for subsequent operations.

As those skilled in the art will understand, only a portion of an automatic machine is illustrated. In the drawings, and looking specifically at FIG. 1, a workpiece which is to have a recess cut therein is indicated at 10. The recess attachment is indicated generally at 12 and includes a slide 14 mounted on a base 16. The slide has a clevis 18 which connects the slide to a rod 20 which, as illustrated in FIG. 3, is connected by a nut 22 to a further rod 24. Rod 24 extends within an adjustment bushing 26 through a rod opening 28. Mounted on rod 24 within adjustment bushing 26 is a stop 30 held in position by a jam nut 32.

Adjustment bushing 26 is threadedly mounted within a non-movable machine member 34 which provides a support base for the recess attachment and will permit movement of the slide toward and away from the workpiece.

Figure 2:
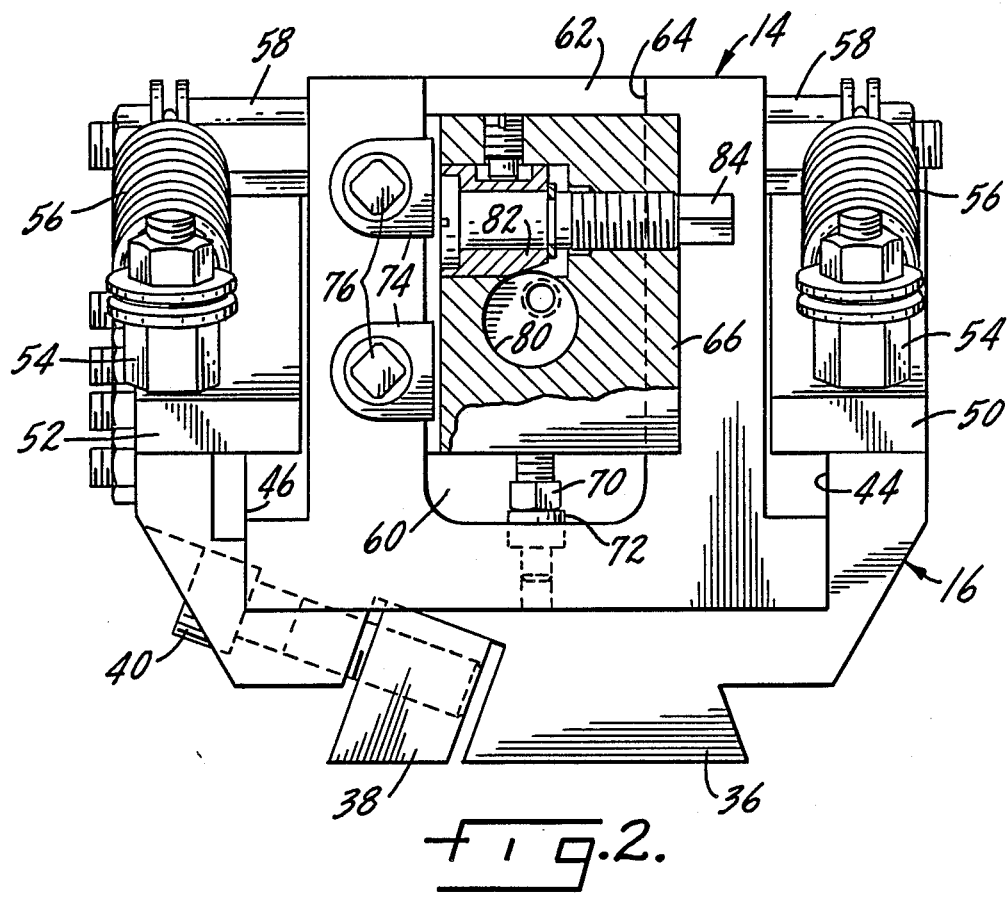
FIG. 2 is a front view of the recess attachment on an enlarged scale, with portions broken away.

Base 16, as particularly illustrated in FIG. 2, has a male dovetail bottom section 36 which will be used in mounting the slide within a mating female dovetail opening on the automatic machine. There is a clamp block 38 and an adjustment or locking screw 40 which will be used to fix the position of the base on the machine.

Base 16 has a slide mounting surface 42 bordered by upstanding walls 44 and 46 which define a way for movement of the slide relative to the base. Surface 42, as indicated in FIG. 1, is formed at an acute angle relative to the line of movement 48 of the cutting tool, which is also parallel to the plane of concurrent movement of the slide and the base.

Base 16 mounts gibs 50 and 52 at the top of the upstanding walls 44 and 46 with the gibs functioning to retain or hold the slide within the way defined by surface 42 and walls 44 and 46.

As indicated in FIGS. 2 and 3, each of the gibs will mount an upstanding hex stud 54 which in turn mounts one end of a coil spring 56. The other end of each of coil springs 56 is mounted to a hex stud 58 which extends outwardly from slide 14. Thus, the coil springs 56, one end being mounted on the base and the other end being mounted on the slide, inhibit relative movement between the slide and the base.

As indicated particularly in FIGS. 2 and 3, the slide has an opening or nest 60 which has two mutually perpendicular wall surfaces 62 and 64 against which a tool holder or block 66 is fixed. Tool block 66 which may mount a cutting tool 68, as indicated in FIG. 1, has an adjustment screw 70 extending from one side thereof which bears against a stop 72 in the form of an adjustably movable button which is attached to the bottom of the slide.

In order to hold tool block 66 within nest 60 there are a pair of clamps 74, each driven in position against tool block 66 by a differential screw 76. As indicated particularly in FIG. 3, tool block 66 has a cam surface 78 opposing clamps 74. Turning of differential screws 76 will cause the clamps to move the tool block 66 against both surfaces 62 and 64 to firmly hold the tool block in an exact position.

Cutting tool 68 is positioned within an opening 80 in the tool block and there is a wedge 82 which is driven by a screw 84 to firmly clamp the tool in the opening 80.

In use of the invention the machine operator will first set the position of the cutting tool within the tool block prior to setting the tool block within the recess attachment. The operator not only sets the position of the cutting tool by the use of a jig or fixture for that purpose, but also sets the position of adjustment screw 70 so that when the tool block is positioned within the slide nest, the cutting tool will be at the correct position relative to the line 48 of tool movement. The operator may in fact have more than one tool block and cutting tool so that as soon as a tool is dull and no longer cutting parts to size, the cutting tool and the quick change tool block may be replaced.

The operator need only replace the tool block and the cutting tool to have a machine set-up which is correct for multiple machining operations. He may want to run one or two pieces to insure that everything is in alignment, but essentially the position of the cutting tool and the adjustment screw 70 are set by the operator on the fixture or jig prior to insertion in the recess attachment.

In use of the recess attachment, the attachment consisting of the base and the slide will move together in unison in response to movement toward the left in FIGS. 1 and 3 by rod 20 and rod 24. At such time as stop 30 contacts adjustment bushing 26, further concurrent movement of the slide and the base will be prevented. At this point the cutting tool 68 should be at a position to begin formation of the recess within the workpiece 10. Further movement of base 16 to the left will cause vertical movement of the slide. Because surface 42, which defines the path of relative movement between the base and the slide, is at an acute angle to the direction of concurrent movement of the base and slide, movement of the base will cause the cutting tool to be indexed outwardly to form a recess in workpiece 10. Thus, movement of base 16 in one direction will cause movement of the slide in a perpendicular direction to cut the recess within the workpiece.

Of particular importance in the invention is the use of preset tooling and a quick change tool holder or tool block. The tool holder may be completely set up on a suitable fixture prior to being positioned within the recess attachment. Since the position of the cutting tool is preset, as is the adjustment screw on the tool holder, there is very little machine down time and very little scrap involved in setting the machine for a new cutting operation.

Whereas the preferred form of the invention has been shown and described herein, it should be realized that there may be many modifications, substitutions and alterations thereto.

The embodiments of the invention in which an exclusive property or privilege is claimed are defined as follows:

1. A recess attachment with preset quick change tooling for use on a multiple spindle automatic machine including:
    a base formed and adapted to be mounted at a work station on an automatic machine, said base being movable in a defined direction during a machining operation and having a slide mounting surface in a plane forming a small acute angle with said direction of movement,
    a slide positioned on said slide mounting surface, spring means attached to said base and slide and inhibiting relative movement therebetween, said slide having a nest with a pair of mutually perpendicular surfaces forming two slides thereof,
    a tool holder removably positioned in said nest and firm against said mutually perpendicular surfaces, an adjustment member positioned on said tool holder and a cooperating stop on an additinal side of said slide nest, said tool holder having a tool receiving opening and means for fastening a cutting tool therein, said cutting tool being preset on said tool holder prior to the mounting of said tool holder in said nest,
    clamping means mounted on said tool holder for holding said tool holder against said mutually perpendicular slide nest surfaces, said clamping means including a pair of differential screws adjustably mounted on said slide and having clamps threadedly mounted thereon, said tool holder having a cam surface cooperazting with said clamps, turning of said differential screws causing said tool holder to be urged simultaneously toward both of said mutually perpendicular surfaces,
    said base and slide moving in unison to a precutting position, further movement of said base relative to said slide causing said slide and the cutting tool mounted thereon to move in a direction generally perpendicular to base movement to cut a recess in a workpiece.

2. The recess attachment of claim 1 further characterized in that said spring means includes a pair of coil springs, one mounted on each side of said slide, with each spring being attached at one end to the base and at the other end to the slide.

3. The recess attachment of claim 1 further characterized in that said base has upstanding walls adjacent opposite sides of said slide mounting surface and gibs mounted to said upstanding walls preventing movement of said slide away from said slide mounting surface.

* * * * *